United States Patent
Martinovsky

(10) Patent No.: US 6,485,218 B1
(45) Date of Patent: Nov. 26, 2002

(54) HOUSING FOR A TAPPET END WHICH IS CONFIGURED AS A BALL HEAD

(75) Inventor: Jan Martinovsky, Steinbach (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/646,696
(22) PCT Filed: Feb. 27, 1999
(86) PCT No.: PCT/EP99/01294
§ 371 (c)(1), (2), (4) Date: Dec. 4, 2000
(87) PCT Pub. No.: WO99/50118
PCT Pub. Date: Oct. 7, 1999

(30) Foreign Application Priority Data

Mar. 28, 1998 (DE) .......................... 198 13 929

(51) Int. Cl.⁷ ............................ B60T 13/52; F16C 11/06
(52) U.S. Cl. ......................................... 403/135; 403/144
(58) Field of Search .................. 403/135, 122, 403/132, 144, 136, 137, 138

(56) References Cited

U.S. PATENT DOCUMENTS 4,318,627 A 3/1982 Morin .......................... 403/133

FOREIGN PATENT DOCUMENTS

| DE | 2135299 | 1/1973 |
| DE | 3937636 | 5/1990 |
| DE | 4419954 | 1/1996 |
| EP | 0768473 | 4/1997 |

*Primary Examiner*—Christopher J. Novosad
(74) *Attorney, Agent, or Firm*—Martin A. Farber

(57) ABSTRACT

In the case of a holder (1) which is intended for a motor vehicle and is for a ball head (10) of a tappet (11), the ball head (10) is enclosed in a sealing manner between an elastic insert body (13) and a sintered insert body (8) forming a ball socket (7), and is fixed in a hollow body (2) by a securing element (21). The securing element (21) and the elastic insert body (13) are provided with openings (15) which enable the ball head (10) to be passed through. As a result, the holder (1) can be fitted in a particularly simple manner. Furthermore, the ball head (10) is protected against the escape of lubricant and against the ingress of dirt particles and, because of the damping properties of the elastic insert body (13), is free of play for its entire working life.

18 Claims, 3 Drawing Sheets

HOUSING FOR A TAPPET END WHICH IS CONFIGURED AS A BALL HEAD

FIELD AND BACKGROUND OF THE INVENTION

The invention relates to a holder for a ball-headed end of a tappet, in particular of a piston rod of a motor vehicle brake cylinder, the holder and the ball head being a pair of components of a ball-and-socket joint which couples a translational movement of the tappet to a rotational movement of a component connected to the holder, in particular of a pedal arm of a brake pedal.

Holders of this type are required, for example, in order to connect the pedal lever of a brake pedal to the ball head of a brake cylinder in an articulated manner and to reliably transmit the pedal force to the tappet. For this purpose, the ball head is inserted into a ball socket which surrounds the ball head over more than 180°, making an articulated connection possible. In this case, the ball head forms a non-releasable unit with the tappet and the cylinder and for this reason the ball socket has to be designed such that it can be divided or deformed elastically in such a manner that the ball head can be clipped into the ball socket.

Divided ball sockets require an undesirably high outlay on installation. A disadvantage in the case of elastic holders of this type is that the connection between the holder and the ball head can be forcibly separated when a maximum permissible force is exceeded. Firmly clamping the ball head in order to avoid this danger restricts the mobility of the ball head in an undesirably severe manner. A further disadvantage is that the vibrations caused by the engine are transmitted by the ball head to the holder and over the long term lead to wear there and therefore also to play in the force transmission. This has, however, to be avoided for safety reasons, particularly in brake systems, and so in this case the replacement of the affected components is required.

SUMMARY OF THE INVENTION

The invention is based on the problem of configuring a holder for a ball head in such a manner that said holder operates reliably and in a manner which is largely free of wear and at the same time can be fitted in a simple manner.

According to the invention, this problem is solved by the holder comprising a cup-shaped hollow body and an elastic insert body arranged within the hollow body, and by the ball head being held in the interior of the hollow body by the insert body by means of a securing means and being prestressed against the base of the hollow body.

By this means, the ball head is fixed by the insert body in such a manner that it is not possible for the ball head to slip out even when subjected to a high load or only by destruction of the securing means. The applied force is therefore reliably transmitted via the holder and the insert body to the ball head and from there, for example, to the tappet of the brake cylinder. At the same time, the design of the insert body as an elastic element, for example elastomer, ensures that vibrations caused in a motor vehicle primarily by the drive and introduced into the holder via the ball head are largely absorbed.

In this connection, a development of the invention is particularly advantageous in which the holder has a further insert body arranged in the hollow body, so that the ball head is fixed between the two insert bodies in the hollow body by means of the securing means. This enables a particularly secure and permanent fixing of the ball head in the holder to be achieved. To this end, the second insert body can be designed, for example, as a sintered component. In this design, the ball head preferably bears against the two insert bodies, which means that a special configuration of the inner surface of the hollow body corresponding to the contour of the ball head can be omitted.

An advantageous development of the invention is provided if the ball head is enclosed in a sealing manner by the two insert bodies. The penetration of dirt particles or moisture is effectively avoided as a result. The wear to the ball head is thereby reduced and therefore the working life of the holder increased. Furthermore, lubricants are prevented from escaping, which means that complicated maintenance work is not needed.

The stated problem is solved especially well, in particular with a further embodiment in which at least one insert body has a recess forming a lubricant magazine. This makes it possible for the quantity of lubricant available for lubricating the ball head, and therefore the working life of the bearing, to be increased.

An advantageous embodiment is provided if the ball head is surrounded over approximately 180° by the insert body. This facilitates the insertion of the ball head into the insert body by the insert body forming a half shell.

The insert body can be divided in a plane lying parallel to the plane which is described by the tappet connected to the ball head. In contrast, another advantageous embodiment is provided by the elastic insert body being provided with an opening which is designed elastically such that in the fitted state it bears against the tappet connected to the ball head, and for installation purposes can be stretched sufficiently far that the ball head can be passed through it. This makes an integral embodiment of the insert body possible. As a result, the use of non-releasable units consisting of a ball head, tappet and cylinder is substantially simplified.

The stretching, required for this, of the insert body is possible in a particularly easy manner if the elastic insert body has a radial constriction on its circumference. By this means, essentially two advantages can be achieved. Firstly, because of the reduction in material thickness the constriction makes it easier to stretch, which simplifies the passing through of the ball head. Secondly, the insert body can be easily compressed and is placed uniformly against the surface of the ball head, as a result of which a compensation of tolerances is also provided at the same time.

In this case, a particularly simple embodiment of the invention is provided if the hollow body is designed as a hollow cylinder closed on one side. The hollow cylinder provided in such a manner, for example, with a cover can thereby easily be provided, on the one hand, with a fastening element for connection to further components. On the other hand, the design of the holder as a hollow cylinder closed on one side improves the stability and durability of the holder. Furthermore, the closed end of the hollow cylinder can serve as an abutment for the securing means, which thus fixes the ball head in the hollow cylinder.

This can take place by means of a particularly advantageous development in which the hollow body has a recess which is designed as a quarter-turn fastener and is designed for fixing the inserted securing means in the hollow body.

For this purpose, the hollow body merely has a correspondingly shaped recess in its circumferential surface, so that the securing means, which is inserted into the hollow body counter to the restoring force of the elastic insert body, is secured in a positive-locking manner in the recess by a rotational movement. To this end, the securing means is provided with at least two extensions projecting over the inner width of the hollow body. As a result this embodiment is favorable to produce and can be fitted or removed easily.

It may be desirable, depending on the use, to individually adapt the tension of the insert body surrounding the ball head. This could be done by replacing an insert body for an insert body having different external dimensions and/or different material properties. However, a development of the invention is particularly advantageous for this in which the quarter-turn fastener is designed for holding additional securing means.

In this connection, with each additional securing means the remaining gap is reduced and the tension of the insert bodies increased. The manufacturing tolerances can therefore be kept relatively large and the adaptation to the ball head can be undertaken during installation by differing the number of securing means. Furthermore, the slackening of the restoring force of the elastic insert body over the working life of the holder can be compensated for in an identical manner without requiring the replacement of the existing insert body for this. In this connection, the holder does not need to be opened in order to insert further securing means, and so dirt is unable to penetrate during the adaptation.

A favorable development of the invention is provided if the securing means is a spring plate. In this case, the tension transmitted to the insert body can be preset by selection of a suitable securing means having a corresponding spring force. The elasticity of the elastic insert body accordingly essentially serves to absorb vibrations, the tension for fixing the ball head being introduced by the spring plate.

The securing means could be arranged laterally next to the ball head. In order to compensate for the non-uniform distribution of forces resulting therefrom, further securing means would then have to be provided. A particularly advantageous embodiment ensures a uniform distribution of force if the securing means has an opening for passing the ball head through it. This enables a uniform transmission of the introduced force from the insert body to the ball head to be achieved.

In this connection, it has proven particularly advantageous if the securing means has sections which are designed as detent pawls and permit the ball head to be passed through in only one direction. By this means, a further improvement in operating safety can be ensured, since, when the ball head is wrenched out of its holder, the detent pawls are plastically deformed beforehand and considerable forces are required for this. At the same time, the installation of a securing means designed in such a manner can be further simplified.

A development of the invention is particularly advantageous in which the holder is arranged on a lever and engages in a connecting element which is designed to absorb the forces which are not axial with respect to the tappet. By this means, the holder can be relieved of forces which are, for example, produced during the pivoting movement because of the change in angular position between the tappet and the lever, and act transversely to the pivot axis. For this purpose, the forces which are not axial are absorbed by the connecting element and the bearing of the lever is relieved of load as a result.

It is particularly favorable for this if the lever and the connecting element are arranged such that they can pivot about a common axis. By this means, the connecting element and the lever execute the same movement with only the axial forces being absorbed by the lever. This relieves the load on the bearing of the lever, at the same time making unrestricted movement of the lever possible.

BRIEF DESCRIPTION OF THE DRAWINGS

The invention permits numerous embodiments. To further clarify its basic principle two of these are illustrated in the figures of the drawings and are described below. In the drawings

DETAILED DESCRIPTION OF THE PREFERRED EMBODIMENT

Figure 1:
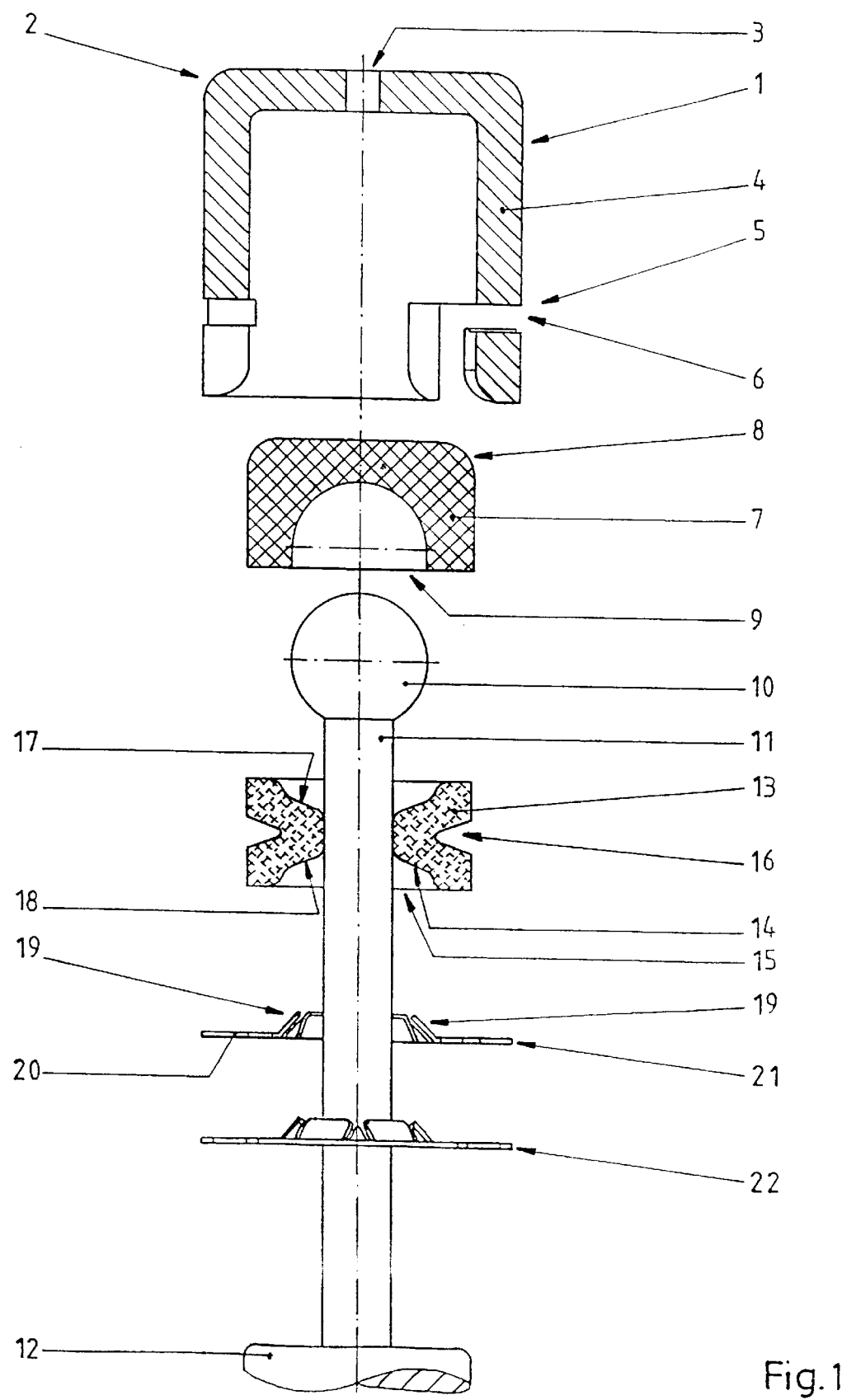
FIG. 1 shows, in a sectional side exploded view, the elements of a holder according to the invention.

FIG. 1 shows, in a lateral, partially sectional illustration, the individual elements of a holder 1 in a non-fitted state. A hollow body 2 can be seen, which is designed as a sleeve which is closed on one side and has, in the upper section, an opening 3 which facilitates the installation and serves to compensate the pressure. In its lower section, a circumferential surface 4 of the hollow body 2 is provided with a recess 6 designed as a quarter-turn fastener 5. An insert body 8, which is designed as a ball socket 7 and may, for example, be a sintered component, is illustrated below the hollow body 2. A ball head 10 can be inserted into an approximately hemispherical depression 9 in the ball socket 7, said ball head being connected integrally to a tappet 11 of a hydraulic cylinder 12, only part of which is illustrated. A further insert body 13, which is designed as an elastomer, is pushed onto the tappet 11 and bears with a bead 14, which spans an opening 15, against the circumference of the tappet 11. The insert body 13 has, in the center of its circumference, a constriction 16 which lies opposite the bead 14. This makes it possible for the insert body 13 to be compressed in the direction of the central axis of the holder 1 and for the opening 15 to be stretched elastically, so that the ball head 10 can be passed through. Furthermore, on its upper and lower sides the insert body 13 has a respective depression 17 and 18 which is preshaped approximately corresponding to the surface of the ball head 10. The lower depression 18 of the insert body 13 is used for the approximately positive-locking insertion of a number of detent pawls 19 of a securing means 21 designed as a spring plate 20. The detent pawls 19 can be deformed elastically in such a manner that they enable the ball head 10 to be passed through in the installation direction, but block the passage in the opposite direction. Wrenching of the ball head 10 out of the holder 1 when the detent force is exceeded therefore causes plastic deformation of the detent pawls 19 and destruction of the securing means 21. For clarification purposes, below the securing means 21, which is illustrated in section, a further securing means 22 of identical construction is illustrated in a non-sectional side view.

Figure 2:
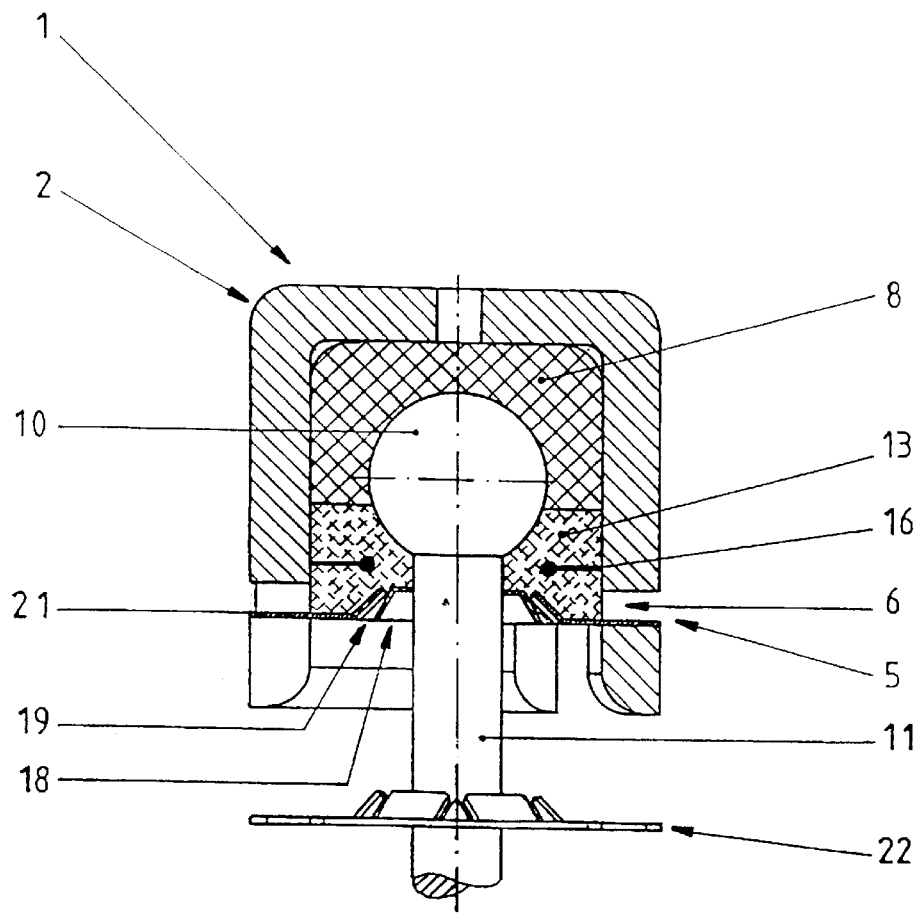
FIG. 2 shows the holder, in a sectional side view, in a fitted state.

FIG. 2 shows, in a predominantly sectional illustration, the holder 1 illustrated in FIG. 1 in a fitted state. The ball head 10 is surrounded here in a sealing manner in the interior of the hollow body 2 by the two insert bodies 8 and 13. The securing means 21 is inserted here counter to the restoring force of the elastic, deformed insert body 13, whose constriction 16 is pressed together here, into the recess 6 of the quarter-turn fastener 5. In this position, the insert body 13 has lost its elasticity to a very large extent. The detent pawls 19 of the securing means 21 bear here against the lower depression 18 of the insert body 13. The second securing means 22 is still in a position outside the holder 1 on the tappet 11, only part of which is illustrated. To further increase the tension, in addition to the securing means 21 which is already fitted, the securing means 22 can be inserted into the quarter-turn fastener 5, the first securing means 21 having to be pushed upward and as this happens further compressing the insert body 13.

Figure 3:
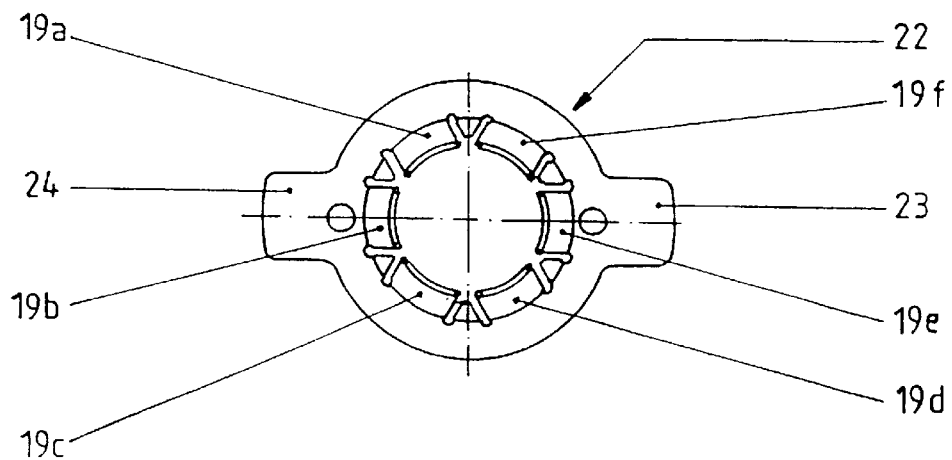
FIG. 3 shows a securing means in a plan view.

FIG. 3 shows the securing means 22 in a plan view. Six detent pawls 19*a*, 19*b*, 19*c*, 19*d*, 19*e* and 19*f* which are distributed uniformly over the circumference and are inclined toward the center can be seen. Furthermore, two opposite extensions 23 and 24 are illustrated, these being used to enable the securing means 22 to be inserted into the recess 6, illustrated in FIGS. 1 and 2, of the hollow body 2.

Figure 4:
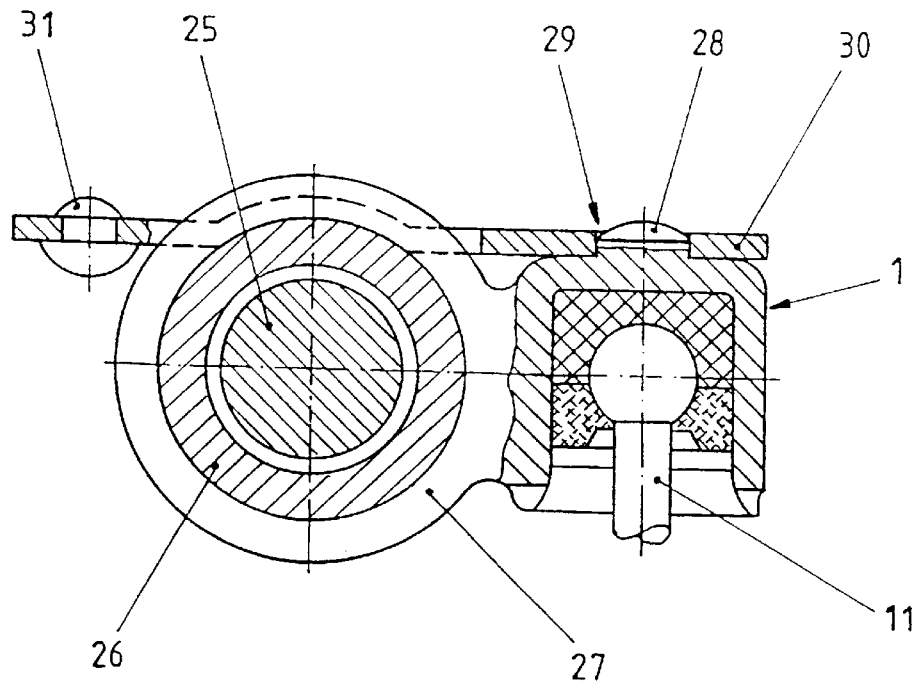
FIG. 4 shows a lever having a further holder according to the invention arranged on it, in a side view.

FIG. 4 shows, in a lateral, partially sectional illustration, a holder 1 which is arranged on a lever 27 which, for its part, is connected to a pedal tube 26 which can be pivoted about an axis 25, for example of a brake pedal arrangement of a motor vehicle. The holder 1 largely corresponds to the embodiment illustrated in FIG. 2 and in addition has a curved pin 28 which engages in a recess 29 of a connecting element 30, which is likewise arranged on the pedal tube 26. By means of this pin 28 the forces which are not parallel to the tappet 11, only part of which is illustrated, are introduced into the connecting element 30 and transmitted from there to the pedal tube 26, which relieves the load on a bearing (not illustrated) of the lever 27. The connecting element 30 additionally has a stop 31 to limit the maximum deflection of the pedal tube 26, which can be pivoted together with the connecting element 30. The lever 27 is mounted with little play and rotatably with respect to the pedal tube 26.

Figure 5:
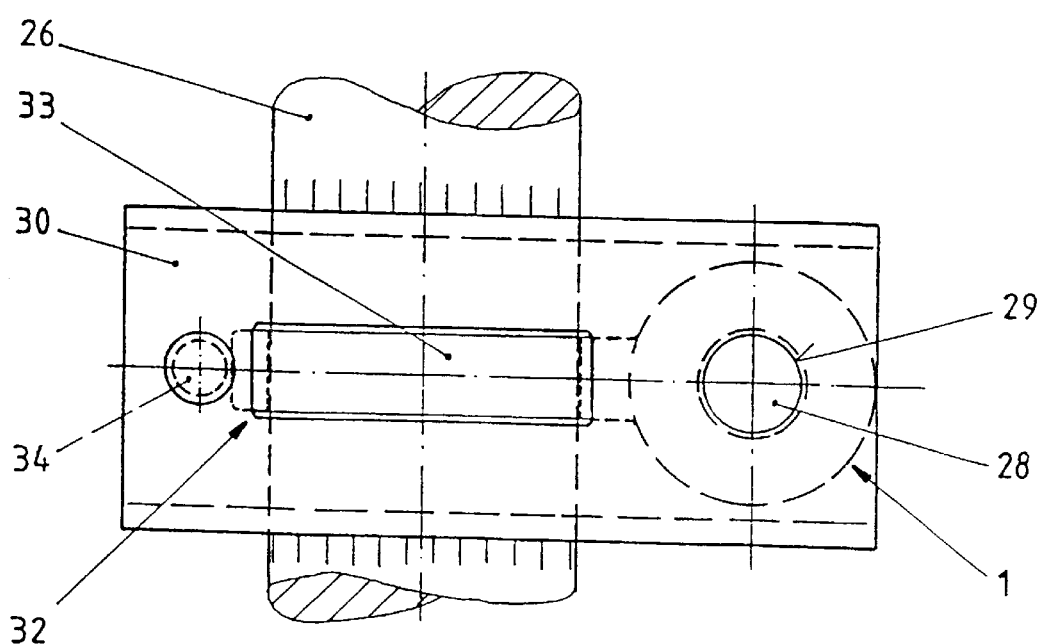
FIG. 5 shows the lever in a plan view.

FIG. 5 shows part of the pedal tube 26, which is illustrated in FIG. 4, with the connecting element 30 arranged thereon, in a plan view. The rectangular shape of the connecting element 30 can be seen, said element being provided with a cutout 32 for a lever section 33, arranged on the pedal tube, of the lever 27, part of which is illustrated by dashed lines. Furthermore, the pin 28 which is inserted into the recess 29 and belongs to the holder 1, illustrated by dashed lines, can be seen. In the illustrated position, the lever 27 is in its inoperative position, with the result that the pin 28 is centered in the recess 29 and is therefore not transmitting any forces to the connecting element 30. A hole 34 can be seen on that side of the connecting element 30 which lies opposite the recess 29, said hole holding the stop 31 which is illustrated in FIG. 4 and can, for example, be an elastomeric element.

I claim:

1. A holder for a ball-headed end of a tappet, the holder and a ball head being a pair of components of a ball-and-socket joint which couples a translational movement of the tappet to a rotational movement of a component connected to the holder, wherein the holder (1) comprises a cup-shaped hollow body (2) and an elastic insert body (13) arranged within the hollow body (2), and wherein the ball head (10) is held in the interior of the hollow body (2) by the insert body (13) by a securing means (21, 22) and is prestressed against a base of the hollow body (2), wherein the hollow body (2) has a recess (6) which is formed as a quarter-turn fastener (5) and is for fixing in the hollow body (2) the securing means (21, 22) inserted in the hollow body (2).

2. The holder as claimed in claim 1, further comprising an additional securing means, and wherein said quarter-turn fastener (5) is for holding said additional securing means (21, 22).

3. A holder for a ball-headed end of a tappet, the holder and a ball head being a pair of components of a ball-and-socket joint which couples a translational movement of the tappet to a rotational movement of a component connected to the holder, wherein the holder (1) comprises a cup-shaped hollow body (2) and an elastic insert body (13) arranged within the hollow body (2), and wherein the ball head (10) is held in the interior of the hollow body (2) by the insert body (13) by a securing means (21, 22) and is prestressed against a base of the hollow body (2), and wherein the elastic insert body (13) is provided with an opening (15) which is elastic such that in a fitted condition said insert body at said opening bears against the tappet (11) connected to the ball head (10), and for installation the opening is stretchable sufficiently far that the ball head (10) is passable therethrough.

4. The holder as claimed in claim 3, wherein the holder (1) has a second insert body (8) arranged in the hollow body (2), such that the ball head (10) is fixed between the two insert bodies (8 and 13) in the hollow body (2) by the securing means (21, 22).

5. The holder as claimed in claim 4, wherein said ball head (10) is enclosed in a sealing manner by the two insert bodies (8 and 13).

6. The holder as claimed in claim 4, wherein at least one of the insert bodies (8, 13) has a recess forming a lubricant magazine.

7. The holder as claimed in claim 3, wherein the ball head (10) is surrounded over approximately 180° by the insert body (8, 13).

8. The holder as claimed in claim 3, wherein the elastic insert body (13) has a radial constriction (16) on its circumference.

9. The holder as claimed in claim 3, wherein the hollow body (2) is a hollow cylinder closed on one side.

10. The holder as claimed in claim 3, wherein the hollow body (2) has a recess (6) which is formed as a quarter-turn fastener (5) and is for fixing in the hollow body (2) the securing means (21, 22) inserted in the hollow body (2).

11. The holder as claimed in claim 10, further comprising an additional securing means, and wherein said quarter-turn fastener (5) is for holding said additional securing means (21, 22).

12. The holder as claimed in claim 3, wherein the securing means (21, 22) is a spring plate (20).

13. The holder as claimed in claim 3, wherein the securing means (21, 22) has an opening for passing the ball head (10) therethrough.

14. The holder as claimed in claim 3, wherein the securing means (21, 22) has sections which are formed as detent pawls (19*a* to 19*f*) and wherein the ball head (10) is passable therethrough in only one direction.

15. The holder as claimed in claim 3, wherein the holder (1) is arranged on a lever (27) and engages in a connecting element (30) which absorbs forces which are not axial with respect to the tappet (11).

16. The holder as claimed in claim 15, wherein said lever (27) and the connecting element (30) are arranged such that they are pivotable about a common axis (25).

17. The holder as claimed in claim 3, wherein the tappet is a piston rod of a motor vehicle brake cylinder, and the component connected to the holder is a pedal arm of a brake pedal.

18. A holder for a ball-headed end of a tappet, the holder and a ball head being a pair of components of a ball-and-socket joint which couples a translational movement of the tappet to a rotational movement of a component connected to the holder, wherein the holder (1) comprises a cup-shaped hollow body (2) and an elastic insert body (13) arranged within the hollow body (2), wherein the ball head (10) is held in the interior of the hollow body (2) by the insert body (13) by a securing means (21, 22) and is prestressed against a base of the hollow body (2), wherein the securing means (21, 22) has sections which are formed as detent pawls (19*a* to 19*f*) and wherein the ball head (10) is passable therethrough in only one direction.

* * * * *